(12) United States Patent
Eyres

(10) Patent No.: US 7,369,605 B2
(45) Date of Patent: May 6, 2008

(54) METHOD AND DEVICE FOR INJECTING A DIFFERENTIAL CURRENT NOISE SIGNAL INTO A PAIRED WIRE COMMUNICATION LINK

(75) Inventor: Jim Eyres, Kanata (CA)

(73) Assignee: Spirent Communications, Ottawa, Ontario (CA)

( * ) Notice: Subject to any disclaimer, the term of this patent is extended or adjusted under 35 U.S.C. 154(b) by 670 days.

(21) Appl. No.: 11/011,616

(22) Filed: Dec. 15, 2004

(65) Prior Publication Data

US 2006/0209968 A1    Sep. 21, 2006

(51) Int. Cl.
*H04B 3/46* (2006.01)
(52) U.S. Cl. .................. 375/224; 375/257; 379/416; 370/247; 370/248; 370/251
(58) Field of Classification Search ................ 375/222, 375/224, 227, 257, 377; 370/241, 247, 248, 370/251, 252; 324/76.1, 612, 613, 620; 379/416
See application file for complete search history.

(56) References Cited

U.S. PATENT DOCUMENTS

| | | | |
|---|---|---|---|
| 6,442,239 B1 * | 8/2002 | Abdo et al. .............. | 379/26.01 |
| 6,459,739 B1 * | 10/2002 | Vitenberg ................... | 375/258 |
| 7,184,469 B2 * | 2/2007 | Joseph et al. ............... | 375/224 |
| 7,260,152 B2 * | 8/2007 | Golo ........................... | 375/257 |

OTHER PUBLICATIONS

Koenig et al. (US 2002/0172159); Nov. 21, 2002; Receier-End Supplementary Circuit For Boundary Scan In Data Transmission With Diffrential Signals.*

* cited by examiner

*Primary Examiner*—Dac V. Ha
(74) *Attorney, Agent, or Firm*—Freedman & Associates

(57) ABSTRACT

The present invention relates to a device and method for injecting a noise signal into a wire pair of a communication link. In operation a first current source and a second current source are disposed in series with a node therebetween coupled resistively to a wire of the wire pair. A current flow path is provided for balancing the current from the two current sources. A similar circuit is also coupled to the other wire of the wire pair.

20 Claims, 4 Drawing Sheets

METHOD AND DEVICE FOR INJECTING A DIFFERENTIAL CURRENT NOISE SIGNAL INTO A PAIRED WIRE COMMUNICATION LINK

FIELD OF THE INVENTION

This invention relates to communication systems and in particular to a method and a device for injecting a noise signal into a paired wire communication link for testing.

BACKGROUND OF THE INVENTION

Recently, there have been dramatic changes in the telecommunications industry. For example, deregulation of local markets resulted in the emergence of new technologies in this industry. Furthermore, a growing demand for Internet access sparked development of new technologies that deliver high speed data services using existing infrastructure.

As is well known in the industry, Digital Subscriber Line, or DSL, is one of the most promising new technologies for delivering superior service and high speed connections using the existing infrastructure. DSL service is implemented in several different ways, such as asymmetrical DSL, or ADSL, where upstream and downstream have different bandwidths, symmetrical DSL, or SDSL, where upstream and downstream have the same bandwidth. In general, these DSL services use the existing copper loop that is used for conventional telephony but provide much higher bandwidth. However, to achieve such high data rates, DSL services operate at higher frequencies and are thus more sensitive to the length and quality of the copper loop. So-called plain old telephone service (POTS) lines were originally designed for voice communications which cover a limited frequency bandwidth of about 4 KHz. As a result, a POTS line that works well transmitting voice signals might not work well for data signals. Therefore, sophisticated testing is needed to find out which lines are not suitable for data transmission and why particular lines are unable to support DSL data transmission.

In order to test the data transmission through a POTS line noise signals simulating cross talk impulses and RF ingress are injected into the line under test. The noise signals need to be injected at an appropriate voltage level without disturbing the impedance of the line under test, or more specific, the test loop. In particular, differential mode noise signals need to be injected at high impedance while common mode noise signals need to be injected at low impedance. In prior art systems noise in injected at an end of a line, via resistors having a large resistance for differential mode noise signals or via resistors having a low resistance for common mode noise signals. Injecting a differential noise signal using such a system requires high supply voltages and an analog circuitry for providing such high voltages. Furthermore, it requires switching between two electrical circuits for injecting a noise signal in differential mode and in common mode. An alternative system utilizes inductive coupling by inserting transformer coils into the line in order to overcome the drawback of high supply voltages. However, in both prior art systems the line needs to be uncoupled at one end or split for injecting of the noise signal.

SUMMARY OF THE INVENTION

It is, therefore, an object of the invention to overcome the drawbacks of the prior art by providing a method and device for injecting a noise signal at a desired location of a communication link.

In accordance with the present invention there is provided a device for injecting a noise signal into a first wire and a second wire of a communication link comprising: a first output port; a second output port; a first input port and a second input port for receiving a differential mode noise signal for being injected into the communication link; a first current source coupled between a first voltage source and a first node; a second current source coupled between a second other voltage source and the first node; a first coupling circuit between the first output port and the first node; a third current source coupled between a first voltage source and a second node; a fourth current source coupled between a second other voltage source and the second node; and, a second coupling circuit between the second output port and the second node.

In accordance with the present invention there is provided a method for injecting a noise signal into a pair of wires of a communication link comprising: injecting a differential mode noise signal into the communication link comprising: providing a current from a first current source; providing a current from a second current source in series with the first current source between a power source and drain; providing current from a first node disposed between the first current source and the second current source to a first wire; providing current from the first node other than to the first wire and other than through the first current source and the second current source; providing a current from a third current source; providing a current from a fourth current source in series with the third current source between a power source and drain; providing current from a second node disposed between the third current source and the fourth current source to a second wire; and, providing current from the second node other than to the second wire and other than through the third current source and the fourth current source.

In accordance with the invention there is further provided a device for injecting a noise signal into a first wire and a second wire of a communication link comprising: a first coupler for coupling to the first wire absent splitting thereof; a second coupler for coupling to the second wire absent splitting thereof; a first current source coupled between a voltage source and a drain and having a first output port; a first coupling circuit between the first output port and the first coupler for conducting current from the first current source to the first wire a second current source coupled between a voltage source and a drain and having a second output port; and, a second coupling circuit between the second output port and the second coupler for conducting current from the second current source to the second wire.

BRIEF DESCRIPTION OF THE FIGURES

Exemplary embodiments of the invention will now be described in conjunction with the following drawings, in which.

DETAILED DESCRIPTION OF THE INVENTION

Figure 1:
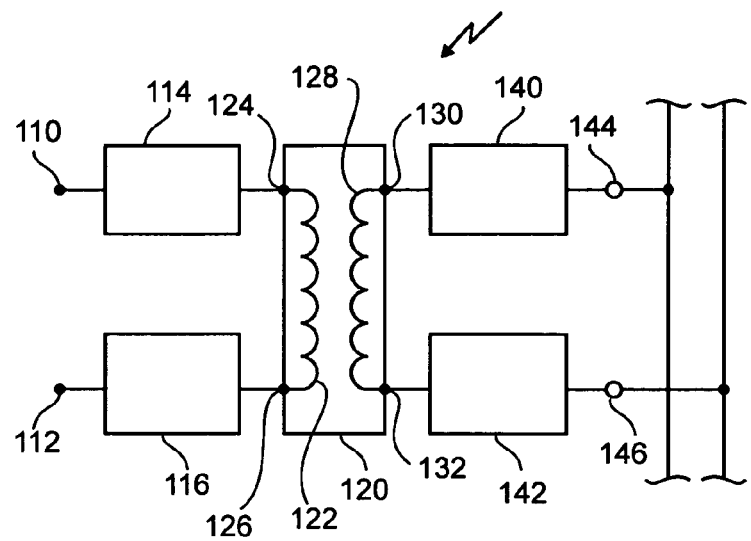
FIG. 1 is a simplified circuit diagram of a device for injecting a noise signal into a pair of wires of a communication link according to the invention.

Referring to FIG. 1 a simple embodiment of a device 100 for injecting a noise signal into a pair of wires of a communication link is shown. In operation a differential mode noise signal is received at input ports 110 and 112, which are connected via resistors 114 and 116 to end taps 124 and 126 of a primary coil 122 of transformer 120, respectively. The transformed differential mode noise signal is then transmitted via end taps 130 and 132 of a secondary coil 128 of the transformer 120 and resistors 140 and 142 to output ports 144 and 146 for injection into a first and a second wire of the communication link. In order to not disturb the impedance of a communication link under test the differential mode noise signal is injected at high impedance. This is achieved in the device 100 through the combination of the resistors 114 and 116 having relatively high impedance with a predetermined range with the transformer 120. By combining a resistor with a transformer as shown in FIG. 1 an impedance proportional to $Rn^2$ is achieved with R being resistance of the resistor and n being the ratio of the windings of the primary coil 122 and the secondary coil 128 of the transformer 120. Compared to prior art devices using only resistors for injecting the differential mode noise signal the device 100 obviates the need for high supply voltages and the analog circuitry supporting such high voltages. Furthermore, a same impedance of the differential mode signal is achieved with resistors having much smaller resistance values, thereby substantially reducing energy losses and, consequently, heat, which is highly advantageous when the circuitry for noise injection is integrated with other electrical components on a circuit board. A major drawback of prior art devices is the coupling to the communication link allowing noise injection only at the ends of a communication link and/or splitting of the communication link for inserting circuit components into the communication link substantially rendering testing and testing equipment inflexible. This major drawback of the prior art is overcome by device 100 allowing injection of a noise signal into the communication link at a desired location without splitting the same, as shown in FIG. 1. Thus, flexibility for testing is substantially increased providing, for example, the capability of manufacturing the noise injection circuit on a circuit board, which is then inserted into a testing device. Design of the components of the device 100 provides operating performance for testing communication links for DSL service such as an operating frequency bandwidth between 4 KHz and 2.2 MHz and linearity within 0.05 dB.

Figure 2:
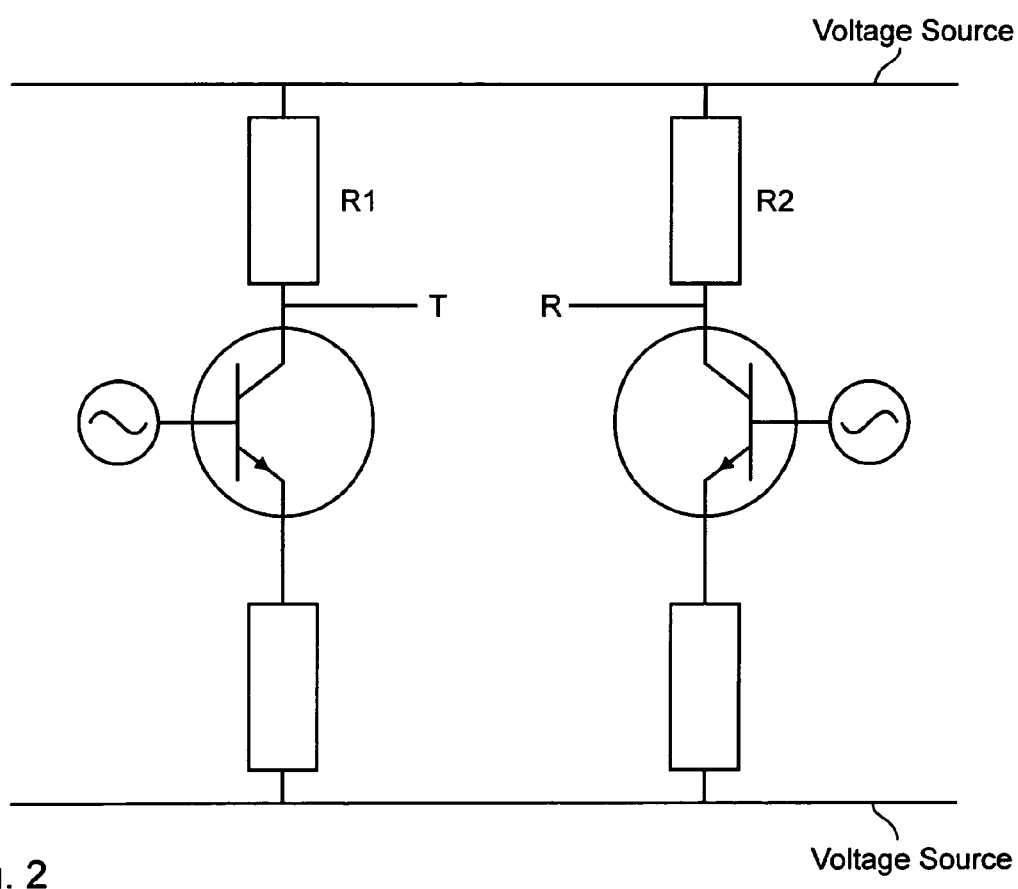
FIG. 2 is a simplified circuit diagram of a device for injecting a noise signal into a pair of wires of a communication link having a low impedance for differential mode noise.

Referring to FIG. 2, a simplified block diagram of a noise injecting circuit according to the invention is shown. A wireline communication path is shown including a first transmission wire T and a second other transmission wire R. The two transmission wires are for conducting a signal in a differential mode. Attached to each of the two transmission lines is a collector of a bipolar junction transistor (BJT) for receiving current at a base thereof. The emitter of each of the transistors is resistively coupled to a voltage source through resistor R1 and resistor R2.

The circuit of FIG. 2 allows for injections of current onto the Tip T and Ring R to result in common mode noise or differential mode noise. The simplicity of the circuit results in lower costs and ease of implementation. Unfortunately, such a circuit appears from the line as a low impedance due to a small resistance of approximately 50 Ω from each R1 and R2. If the resistance of R1 and R2 is substantially larger, then the voltage from the voltage source also needs to be raised substantially. In testing applications, it is desirable to have a high impedance as viewed from the line.

Figure 3:
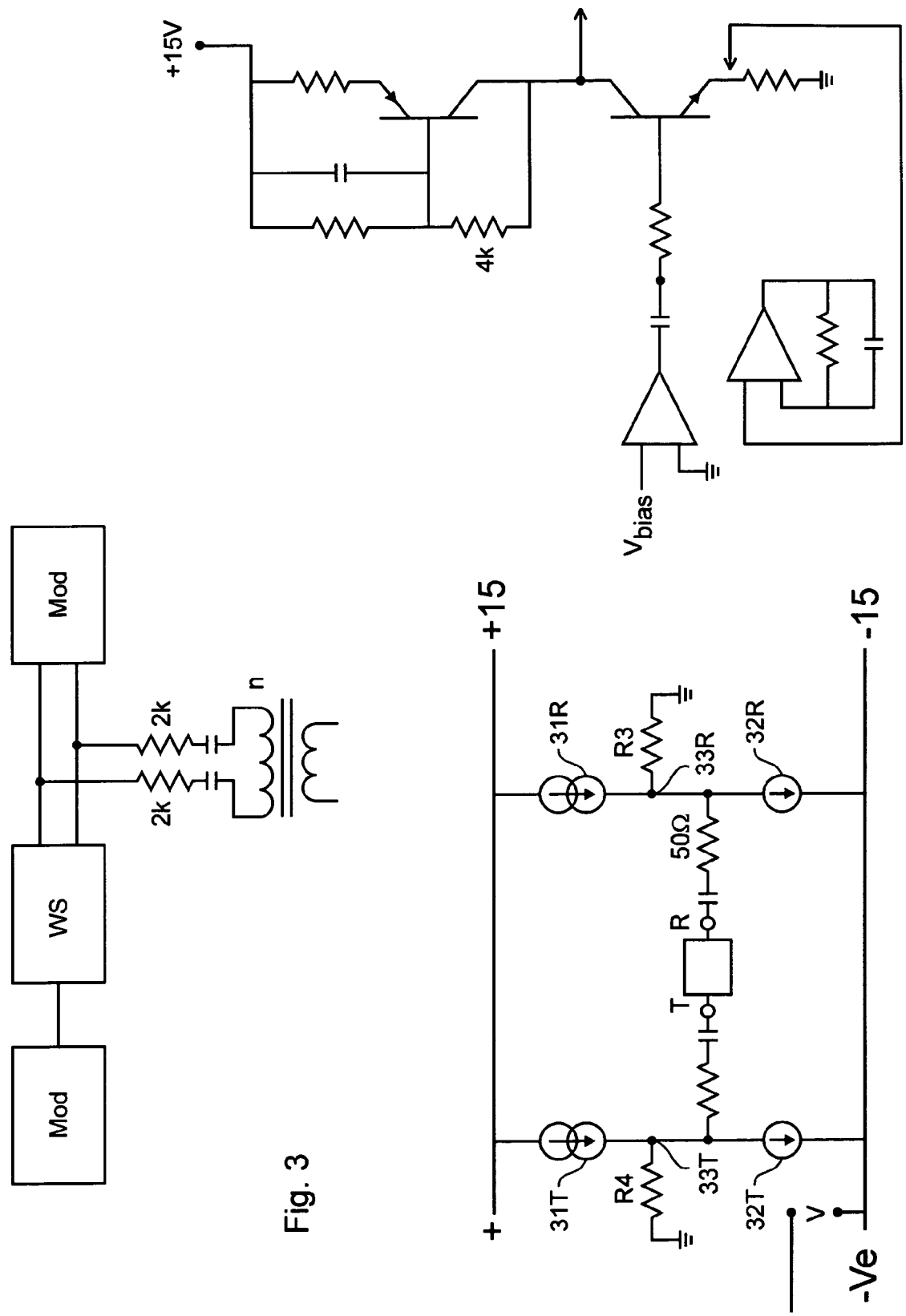
FIG. 3 is a simplified circuit diagram of a device for injecting a noise signal into a pair of wires of a communication link having a high impedance for differential mode noise; and, FIGS. 4a and 4b are a detailed circuit diagram of a device for injecting a noise signal into a pair of wires of a communication link having a high impedance for differential mode noise.

Referring to FIG. 3, another noise injecting circuit is shown. Here, two approximately identical circuits are provided for driving the Tip T and Ring R, respectively. The first circuit includes a first current source 31R and a second current source 32R. A node 33R between the first current source 31R and the second current source 32R is resistively coupled to a reference voltage (shown as ground). The same node 33R is resistively and capacitively coupled to the Tip line T. The circuit provides a high impedance as viewed from the tip T due to the resistor R4 providing a large resistance in the form of 4 kΩ. Similarly, resistor R3 provides a resistance in the form of 4 kΩ. The presence of the resistive coupling from the node 33R to ground allows for current source imbalances resulting from variations in manufacture and so forth, to have little effect on circuit operation. Alternatively, other resistance values for providing higher or less impedance are optionally used. Advantageously, the circuit does not require inductors thereby allowing a wider frequency range of operation.

Of course, a similar circuit having same reference numerals followed by a T instead of an R is shown on the other side of the circuit.

Advantageously, the circuit of FIG. 3 provides for a high impedance, which is desirable for testing applications, for a differential mode current noise injecting circuit.

Figure 4A:
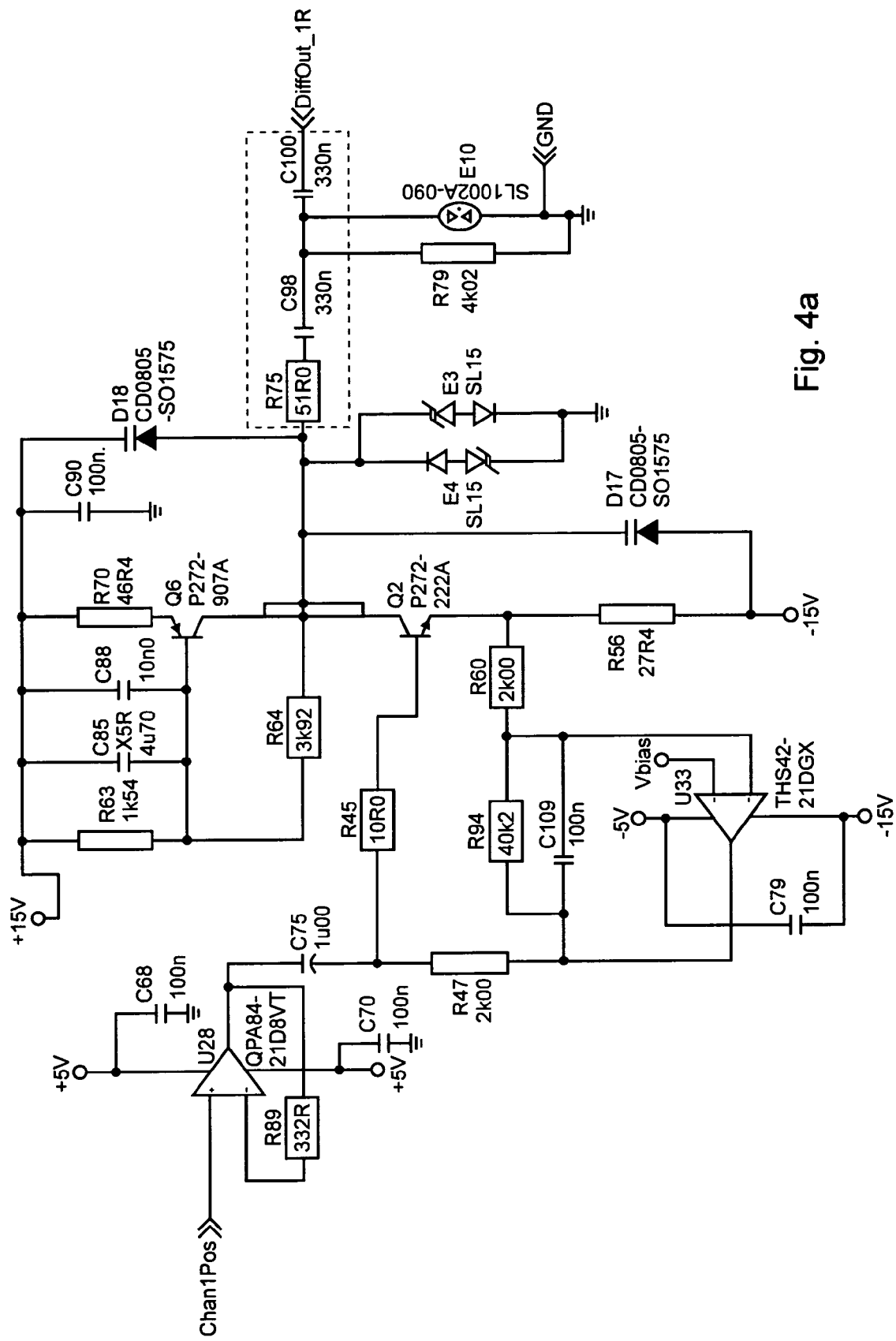
Figure 4B:
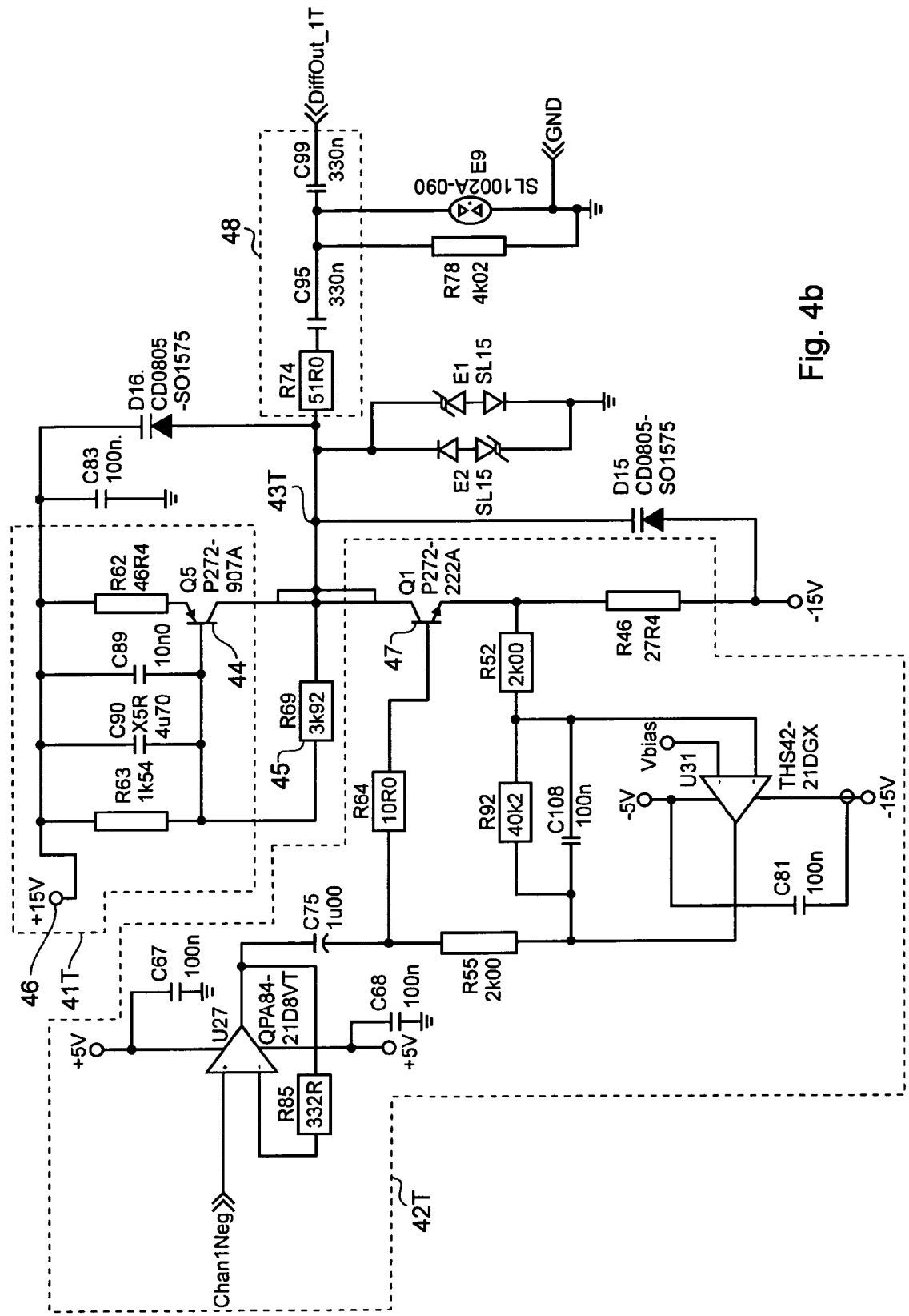

Referring to FIG. 4b, a detailed schematic diagram of a circuit according to the invention is shown. Here, the current source 41T comprises a BJT 44 with associated components. The current source 41T is coupled between a voltage source 46 and node 43T. A feedback resistor 45 is disposed for stabilizing the current source for operation with another current source. The feedback resistor 45 has a similar function to the resistive coupling to ground for node 33T in FIG. 3. That said, in the exemplary circuit design of FIG. 4b, the feedback resistor 45 was found to function adequately. A second current source 42T includes a BJT 47 and associated circuitry. Similar to the circuit shown in FIG. 3, resistive and capacitive coupling 48 couples the node 43T to the Tip T. An analogous circuit is also used to couple current noise into the ring R as shown in FIG. 4a.

The above circuit design results in a highly advantageous feature of allowing injection of a differential mode noise signal at high impedance. As will be evident to those of skill in the art, other components are usable in forming the current source, the feedback circuit, and the resistive or resistive capacitive coupling. For example FET transistors are employable in place of BJTs with necessary modifications to the circuit as will be apparent to those of skill in the art.

Numerous other embodiments of the invention will be apparent to persons skilled in the art without departing from the spirit and scope of the invention as defined in the appended claims.

What is claimed is:

1. A device for injecting a noise signal into a first wire and a second wire of a communication link comprising:
   a first output port;
   a second output port;
   a first input port and a second input port for receiving a differential mode noise signal for being injected into the communication link;
   a first current source coupled between a first voltage source and a first node;
   a second current source coupled between a second other voltage source and the first node;
   a first coupling circuit between the first output port and the first node;
   a third current source coupled between a first voltage source and a second node; a fourth current source coupled between a second other voltage source and the second node; and,
   a second coupling circuit between the second output port and the second node.

2. A device according to claim 1, wherein the first coupling circuit comprises a resistive coupling between the first node and the first output port and the second coupling circuit comprises a resistive coupling between the second node and the second output port.

3. A device according to claim 2, wherein the coupling circuit comprises a capacitive coupling between the first node and the first output port and the second coupling circuit comprises a capacitive coupling between the second node and the second output port.

4. A device according to claim 1, comprising a current path from the first node, the current path other than the first current source and the second current source.

5. A device according to claim 4, wherein the current path is a current path to a voltage source.

6. A device according to claim 5, wherein the current path is a current path to ground.

7. A device according to claim 6, wherein the current path comprises a resistor for providing a high impedance when viewed from a wire of the first wire and the second wire.

8. A device according to claim 4, wherein the current path is feedback current path.

9. A device according to claim 8, wherein the current path comprises a resistor for providing a high impedance when viewed from a wire of the first wire and the second wire.

10. A device according to claim 1, wherein the first current source comprises a BJT and wherein the second current source comprises a BJT.

11. A device according to claim 10, wherein the third current source comprises a BJT and wherein the fourth current source comprises a BJT.

12. A device according to claim 1, wherein the first current source comprises a FET and wherein the second current source comprises a FET.

13. A device according to claim 10, wherein the third current source comprises a FET and wherein the fourth current source comprises a FET.

14. A method for injecting a noise signal into a pair of wires of a communication link comprising:
   injecting a differential mode noise signal into the communication link comprising:
   providing a current from a first current source;
   providing a current from a second current source in series with the first current source between a power source and drain;
   providing current from a first node disposed between the first current source and the second current source to a first wire;
   providing current from the first node other than to the first wire and other than through the first current source and the second current source;
   providing a current from a third current source;
   providing a current from a fourth current source in series with the third current source between a power source and drain;
   providing current from a second node disposed between the third current source and the fourth current source to a second wire; and,
   providing current from the second node other than to the second wire and other than through the third current source and the fourth current source.

15. A method according to claim 14, wherein the differential mode noise signal is provided to the first and the second wire without splitting the first wire and without splitting the second wire.

16. A method according to claim 14, wherein the current from the first node other than to the first wire and other than through the first current source and the second current source is for balancing of current provided from each of the first and second current sources.

17. A method according to claim 16, wherein the current from the second node other than to the second wire and other than through the third current source and the fourth current source is conducted through a circuit for presenting a high impedance when viewed from the first wire.

18. A method according to claim 14, wherein the current from the second node other than to the second wire and other than through the third current source and the fourth current source is for balancing of current provided from each of the third and fourth current sources.

19. A method according to claim 14, wherein the current from the second node other than to the second wire and other than through the third current source and the fourth current source is conducted through a circuit for presenting a high impedance when viewed from the second wire.

20. A device for injecting a noise signal into a first wire and a second wire of a communication link comprising:
   a first coupler for coupling to the first wire absent splitting thereof;
   a second coupler for coupling to the second wire absent splitting thereof;
   a first current source coupled between a voltage source and a drain and having a first output port;
   a first coupling circuit between the first output port and the first coupler for conducting current from the first current source to the first wire;
   a second current source coupled between a voltage source and a drain and having a second output port; and,
   a second coupling circuit between the second output port and the second coupler for conducting current from the second current source to the second wire.

* * * * *